United States Patent [19]
Okuda

[11] 3,875,985
[45] Apr. 8, 1975

[54] DEVICE FOR FIXING BOLTS AND NUTS
[75] Inventor: Hiroji Okuda, Kita-Katsuragi, Japan
[73] Assignee: Koyo Seiko Company Limited, Osaka, Japan
[22] Filed: Dec. 7, 1973
[21] Appl. No.: 422,911

[30] Foreign Application Priority Data
Apr. 7, 1973 Japan.............................. 48-41886

[52] U.S. Cl. ................................................. 151/44
[51] Int. Cl. ........................................... F16b 39/10
[58] Field of Search ............ 151/44, 55, 54, 68, 37; 85/9 W, 9 R

[56] References Cited
UNITED STATES PATENTS
| | | | |
|---|---|---|---|
| 392,702 | 11/1888 | Throckmorton | 151/44 |
| 448,385 | 3/1891 | Unckrich | 151/55 |
| 756,423 | 4/1904 | Smith | 151/55 |

Primary Examiner—Ramon S. Britts
Attorney, Agent, or Firm—Mason, Fenwick & Lawrence

[57] ABSTRACT

The device is a combination of a plate designed to lock a bolt or a nut against rotation and a member adapted to prevent disengagement of the plate. The plate is formed with a hole equal in shape to a bolt head or a nut, and is formed with edges each adapted to be laid in contact with the side of a stepped portion of the member to which the bolt or nut is fastened. By insertion of the holed plate around the bolt head or nut, one of the edges comes into contact with the lateral side of the stepped portion and then the check member adapted to protect the plate against disengagement is fixed to the bolt head or nut.

3 Claims, 9 Drawing Figures

DEVICE FOR FIXING BOLTS AND NUTS

BACKGROUND OF THE INVENTION

This invention relates to a device for fixing bolts and nuts. Conventionally, a tongued washer, locknut, etc. have widely been used as a means to prevent loosening of bolts and nuts.

However, since a tongued washer is designed to lock a bolt or nut against rotation by disposing the tongued washer between the bolt and the member into which the bolt is screwed or between the nut and the member, bending the tongue protrudently formed on the washer and pressing against the head of the bolt or the nut side, it often happens that the bent tongue, particularly when vibrations are heavy, is broken or straightened, thus losing its durability and reliability.

On the other hand, a locknut is designed to prevent loosening of a nut by additionally bringing the licknut into threaded engagement with the nut which threadedly mates with a bolt to fasten one member to another. In this case also, the nut which fastens the member to be fitted is liable to get loosened by the loosening of the licknut caused by vibrations, and is not reliable in its function. Furhtermore, the use of the locknut renders it necessary to make the length of a bolt longer by the thickness of one nut, and hence the nut thus used increases the clamping height of the nut, and accordingly the locknut is very inconvenient in point of space for fixing. Furthermore, in addition to the means described above, the use of a split pin or M.J.Madsen U.S. Pat. No. 3,351,116 is known as an anchoring means.

SUMMARY OF THE INVENTION

An object of this invention is to tightly lock a bolt or a nut to thereby completely prevent loosening of the bolt or nut by a very simple structure.

Another object of the invention is to provide a locking means capable of being used with the parts subject to heavy vibrations and having sufficient durability and reliability.

Still another object of the invention is to provide the locking means of the type described which is very small in the space for fitting.

According to the invention, a rotation locking plate having a hole therein the same in shape with the head of a bolt or with a nut is inserted around the head or the nut, and the rotation locking plate brings one edge thereof into contact with the stepped portion side formed in the member to which said bolt or nut is attached at the same time as said insertion is over and thus locks the bolt or nut against rotation in cooperation with the stepped portion.

To the bolt or nut is further fastened a disengagement prevention member designed to prevent the rotation locking plate from slipping out of the bolt or nut. Thus, the rotation locking plate is positively secured and fastens a bolt or a nut to the member to which it is attached.

The rotation locking plate of the invention may be used in the form of an ordinary blanked product as it is punched on the press machine, and requires no particular finishing measures for working of the product. Also, the aforestated engagement prevention member is press fitted into the head of the bolt or into the nut, or secured thereto by welding, bonding or the like.

Other objects and features of this invention will become more apparent from the following description made in conjunction with the accompanying drawings.

DESCRIPTION OF THE PREFERRED EMBODIMENTS

Figure 1:
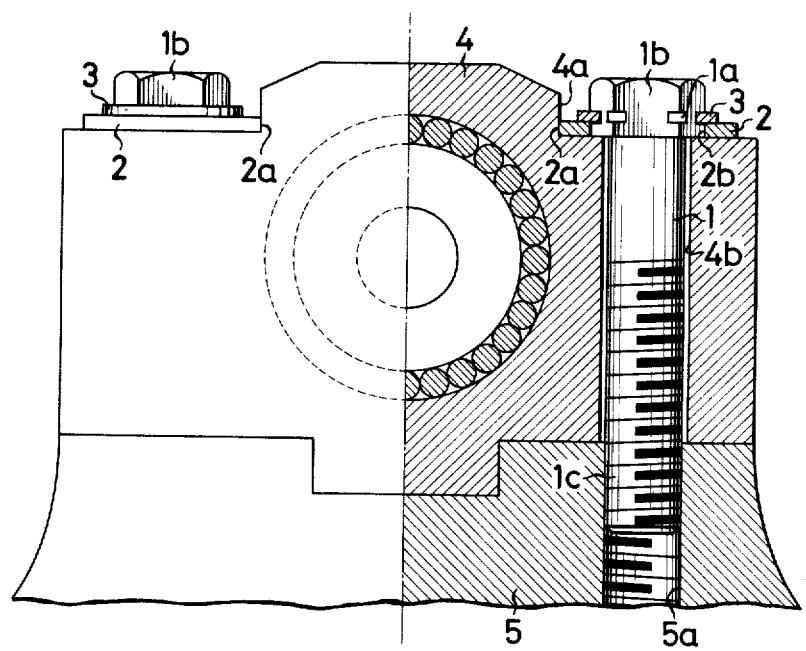
FIG. 1 is a longitudinal sectional elevation showing one embodiment of the invention.
Figure 2:
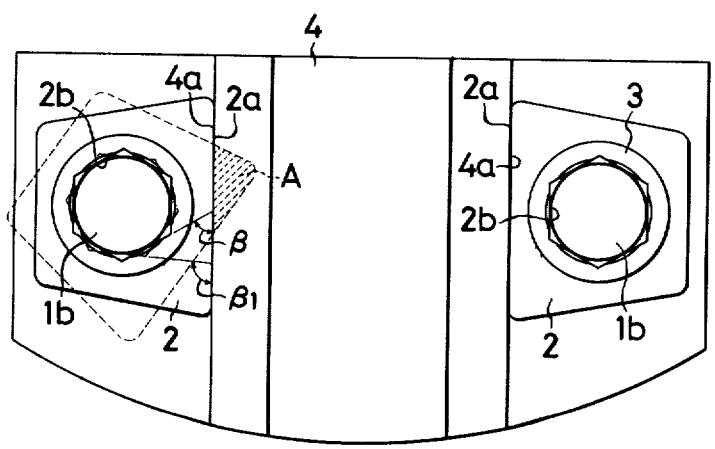
FIG. 2 is a plan view of the embodiment in FIG. 1.

In FIGS. 1 and 2 is shown a hexagonal bolt 1, which is inserted through a hole 1b formed in a member 4 to which the bolt 1 is secured. The bolt 1 brings a threaded part 1c thereof into engagement with a threaded hole 5a formed in a member 5 to receive the member thereon so as to securely fix both members 4 and 5.

A rotation locking plate 2 is inserted around the lower part of head 1b of the bolt 1, said plate 2 being formed with a hole 2b of the same hexagonal shape with the bolt head 1b. The plate 2 is formed on at least one of the edges thereof with a rotation locking edge 2a so that, upon insertion of the hole 2b around the head 1b, the plate 2 is prevented from being rotated by the edge 2a being placed in contact with a stepped portion side 4a formed on the member 4. Of course, it is desirable that the hole 2b be formed in such a size as to provide little or no gap between the hole 2b and the head 1b or that the hole 2b be formed slightly smaller so as to permit forced insertion thereof around the head 1b.

Figure 3:
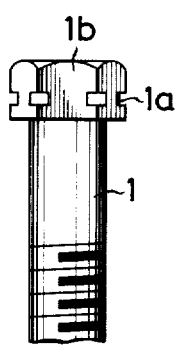
FIG. 3 is a front elevation of a bolt head in the embodiment in FIG. 1.

To the head 1b of the bolt 1 is further secured a disengagement prevention member 3 adapted to prevent the rotation locking plate 2 from slipping out of the bolt head. The member 3 in the embodiment shown in FIGS. 1 and 2 consists of a washer 3, and the washer 3 is press fitted into grooves 1a formed in the edge line portions of the head 1b as shown in FIG. 3 so as to depress the upper surface of the rotation locking plate 2 and prevent disengagement of the plate 2.

Figure 4:
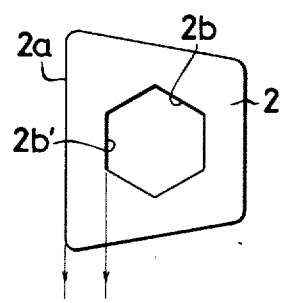
FIG. 4 is a front elevation of a rotation locking plate in the embodiment in FIG. 1.
Figure 5:
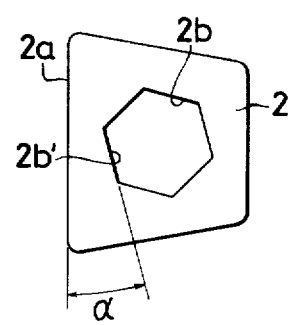
FIGS. 5, 6, and 7 are plan views showing some of other embodiments of the rotation locking plate.

The rotation locking plate 2 is constructed in the manner shown in FIGS. 4 and 5. The rotation locking plate shown in FIG. 4 has a rotation locking edge 2a formed in parallel to one side 2b' of the hexagonal hole 2b and the locking plate 2 shown in FIG. 5 is formed in such a manner that the rotation locking edge 2a makes an angle α with respect to the one side 2b'. Thus, the advance manufacture of several kinds of rotation locking plates 2 as shown in FIGS. 4 and 5 in preparation for assembling of the members 4 and 5 makes it possible to cope with the changes in angle of fixation β of the head 1b in connection with the head 1b and the stepped portion side 4a when the bolt 1 is fixed.

Namely, when the bolt is fixd, the angle of fixation β of the head 1b with respect to the side of the stepped portion is not always definite, and if the bolt 1 is fixed with the angle of fixation β being changed to an angle $β_1$ as shown in FIG. 2, fixation of the plate 2 as by use of the plate 2 shown in FIG. 4 is rendered practically impossible because the portion shown in broken lines A in FIG. 2 protrudes beyond the stepped portion side 4a. Namely, under the circumstances described, the use of the plate 2 shown in FIG. 5 would provide smooth fitting.

Figure 6:
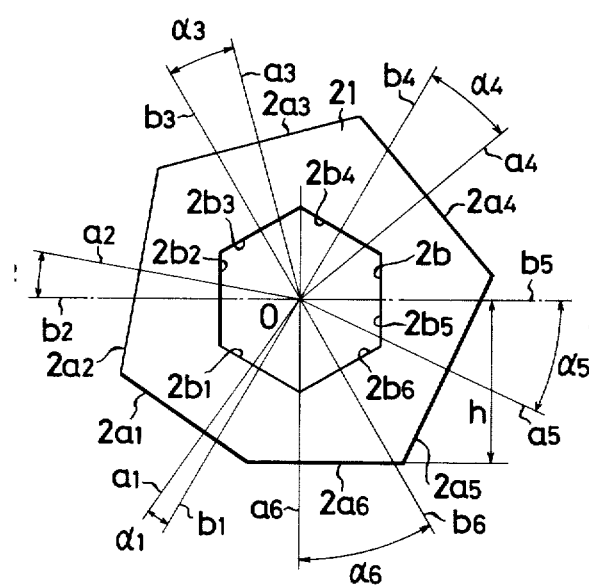

The plate 21 shown in FIG. 6 is contemplated to omit the number of steps necessary for manufacturing several kinds of plates 2 of the configurations shown in FIGS. 4 and 5 in preparation for assembling of the members 4 and 5 and to dispense with the trouble for keeping of such varied kinds of plates 2. The rotation locking plate 21 shown is provided on the circumference thereof with six rotation locking edges $2a_1, 2a_2, \ldots 2a_6$ so as to obtain the same effect by use of only one locking plate 21 as produced by keeping several kinds of locking plates 2 in preparation of possible use. The edges $2a_1, 2a_2, \ldots 2a_6$ are not only so formed as to provide various angles so that the angles which perpendiculars $b_1, b_2, \ldots b_6$ drawn from the center 0 of the hexagonal hole 2b of the plate 2 to the sides $2b_1, 2b_2, \ldots 2b_6$ forming the hole 2b make with perpendiculars $a_1, a_2, \ldots a_6$ drawn from said center 0 to the edges $2a_1, 2a_2, \ldots 2a_6$ may be brought into such relationship as for example $\alpha_1 = 5°, \alpha_2 = 10°, \alpha_3 = 15°, \alpha_4 = 20°, \alpha_5 = 25°$, and $\alpha_6 = 30°$, but also so formed as to make all distances $h$ from the center 0 to the edges $2a_1, 2a_2, \ldots 2a_6$ equal. It should be understood that the angles in question $\alpha_1, \alpha_2, \ldots \alpha_6$ are not limited to the angles described but may suitably be changed.

Accordingly, even if the angle of fixation $\beta$ of the head 1b of the bolt changed to the angle $\beta_1$ described and other angles, rotation of the plate 2 could be checked by placing any one of the six edges $2a_1, 2a_2, \ldots 2a_6$ formed on the circumference of one locking plate 21 into abutment with the stepped portion side 4a of the member 4. Further, because the distance from the center 0 to the edges $2a_1, 2a_2, \ldots 2a_6$ is made equal, each of the edges $2a_1, 2a_2, \ldots 2a_6$ is always definite in position of contact with the stepped portion side 4a of the member 4, and there is no possibility of reduction in the effect of locking the plate against rotation because of loosened contact between each of the edges and the side 4a.

Figure 7:
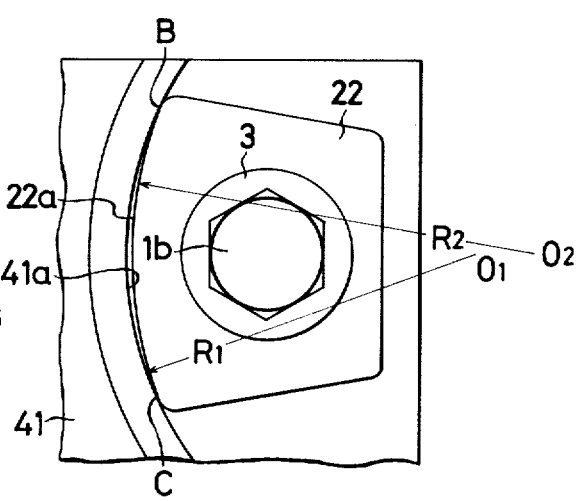

Additionally, the plates 2 and 21 shown in FIGS. 4, 5 and 6 are suitable when the side of the stepped portion of the member 4 is flat, but they provide possibility of the locking effect against rotation becoming instable because of contact being provided at one point by a corner of the locking plate 2 being brought into engagement with the side of the stepped portion, when the side of the stepped portion is curved. Accordingly, in such a case, the use of a rotation locking plate 22 as shown in FIG. 7 can entirely eliminate the instability of locking effect described above and provides prevention of loosening. Namely, the embodiment in FIG. 7 is shown as being formed such that the stepped portion side 41a of the member 41 and the edge 22a of the plate 22 form arcs having radii $R_1$ and $R_2$ respectively, and the radii $R_1$ and $R_2$ are different in their positions of center $O_1$ and $O_2$ and set in relationship $R_1 R_2$. Thus, both end portions of the edge 22a brought into contact at two points B and C with the side 41a of the stepped portion to thereby provide secure locking against rotation.

Figure 8:
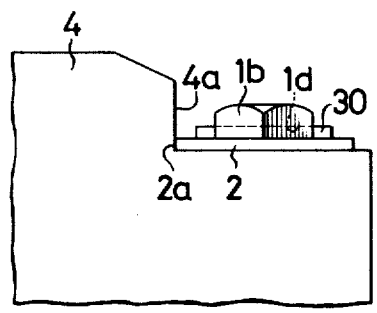
FIG. 8 is a front elevation of the main part of another embodiment.
Figure 9:
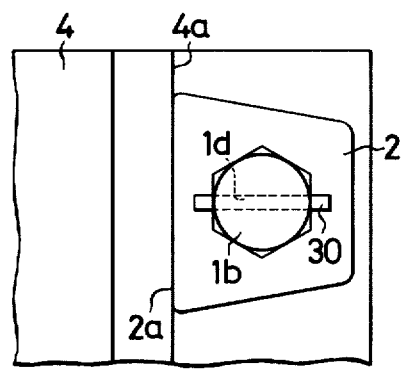
FIG. 9 is a plan view of the embodiment in FIG. 8.

FIGS. 8 and 9 show an embodiment in which, instead of the aforestated washer 3, a pin 30 is inserted through a small hole 1d horizontally formed in the head 1b of the bolt 1 and is used as a means to prevent disengagement of the locking plate 2. The pin 30 is fixed to the head 1b as by welding, bonding or the like. By so doing, not only more simple fixing of the plate 2 to the head 1b of the bolt 1 but also more positive prevention of slipping of the plate 2 out of the bolt 1 can be attained than in the case in which the washer 3 is used.

Also, the figures illustrate the hole 1d in question with reference to the case in which it is used as a through hole of the head 1b, recourse may be had to a method by which the hold 1d may be provided in the form of a dead hole and the pin 30 may be inserted into the hole 1d and fixed to the plate 2 as by welding, bonding or the like.

The aforestated rotation locking plates 2, 21 and 22 of the invention can be blanked out of a sheet material and can be placed on a mass production basis at reduced cost of production and also make it possible to reduce the clamping height of a bolt or nut to thereby reduce the space required for fixing and also make it extremely simple and easy to fix the disengagement prevention members 3 and 30.

Also, when the prevention member 3 or 30 is attached to the bolt or nut, it is only necessary to form grooves in the edge line portions of the head of the bolt or of the nut or to form a pin hole in the side of the head of the bolt or of the nut, and hence no need of complicated working in the bolt or nut itself.

It is to be understood that the invention embodied in the aforestated bolt and nut are not limited to the hexagonal bolt and nut alone, but may be embodied in a square bolt, square nut and various other square bolts and nuts.

What is claimed is:

1. A holding device for fixing either a bolt head or nut having an outer peripheral portion concentric with their axes and mounted on a fixed member having a stepped portion side, said holding device comprising a rotation locking plate having a central opening of the same shape as said peripheral portion of the bolt head or nut and having internal sides dimensioned to be matingly fitted over the bolt head or nut to be concentric with respect to the axis of said bolt head or nut and a plurality of rotation locking outer edges defining a portion of its outer periphery, each of said locking outer edges being oriented at an acute angle with respect to its respective corresponding most closely adjacent internal side of said central opening, said acute angles between different outer edges and their corresponding sides of the central opening all being different and said outer edges all being formed at an equal distance from the center of the central opening so that one of said locking outer edges is engageable with said stepped portion side to prevent rotation of said bolt head or nut and disengagement prevention means fixed to the bolt head or the nut for preventing disengagement of the rotation locking plate from the bolt or nut.

2. The invention of claim 1 wherein one internal side of said central opening formed in said rotation locking plate is parallel to the outer edge of the rotation locking plate to which it is mostly closely spaced.

3. The invention of claim 1 wherein said outer edges define the entire outer periphery of said rotation locking plate.

* * * * *